(12) United States Patent
Sutton

(10) Patent No.: US 6,726,073 B2
(45) Date of Patent: Apr. 27, 2004

(54) BOAT-CARRYING RACK

(76) Inventor: Robert E. Sutton, 262 Johnson St., Doyline, LA (US) 71023

( * ) Notice: Subject to any disclaimer, the term of this patent is extended or adjusted under 35 U.S.C. 154(b) by 86 days.

(21) Appl. No.: 10/123,388

(22) Filed: Apr. 16, 2002

(65) Prior Publication Data

US 2002/0153397 A1 Oct. 24, 2002

Related U.S. Application Data

(60) Provisional application No. 60/285,521, filed on Apr. 23, 2001.

(51) Int. Cl.[7] .................................................. B60R 9/00
(52) U.S. Cl. ........................ 224/405; 224/403; 224/550; 224/551; 224/564
(58) Field of Search ............................... 224/403, 405, 224/550, 551, 552, 555, 564; 414/462, 538

(56) References Cited

U.S. PATENT DOCUMENTS

| | | | | |
|---|---|---|---|---|
| 3,550,800 A | * | 12/1970 | Robinson | 414/462 |
| 3,734,321 A | * | 5/1973 | Long et al. | 414/462 |
| 4,274,788 A | | 6/1981 | Sutton | 414/462 |
| 4,960,356 A | * | 10/1990 | Wrenn | 414/462 |
| 5,005,846 A | | 4/1991 | Taylor | 280/30 |
| 5,090,335 A | * | 2/1992 | Russell | 224/403 |
| 5,257,728 A | * | 11/1993 | Gibson | 224/405 |
| 5,354,164 A | | 10/1994 | Goss et al. | 414/224 |
| 5,542,810 A | | 8/1996 | Florus | 414/538 |
| 6,099,232 A | * | 8/2000 | Dixon et al. | 414/538 |
| 6,491,331 B1 | * | 12/2002 | Fox | 224/403 |

* cited by examiner

Primary Examiner—Gary E. Elkins
(74) Attorney, Agent, or Firm—John M. Harrison

(57) ABSTRACT

A boat-carrying rack which is removably fitted to the bed of a pickup truck for carrying a pirogue or other lightweight boat on the truck. In a preferred embodiment, the boat-carrying rack is characterized by an elongated, rectangular rack frame having a pair of fixed outriggers and two pairs of padded, lever-operated foot plates mounted on adjustable outriggers which are selectively extended from opposite sides of the rack frame, respectively, to engage the opposing side walls of the pickup truck bed and removably secure the rack frame in the bed. The rack frame receives the boat, and a bow mount provided on the front end of the rack frame is removably fastened to the bow of the boat by means of a cord. A pair of upward-standing boat guides provided on respective sides of the rack frame receive an adjustable tie-down strap for securing the boat on the rack frame. The padded foot plates can be selectively disengaged from a common side wall of the pickup truck bed to facilitate removing the boat-carrying rack from the truck, as desired.

15 Claims, 4 Drawing Sheets

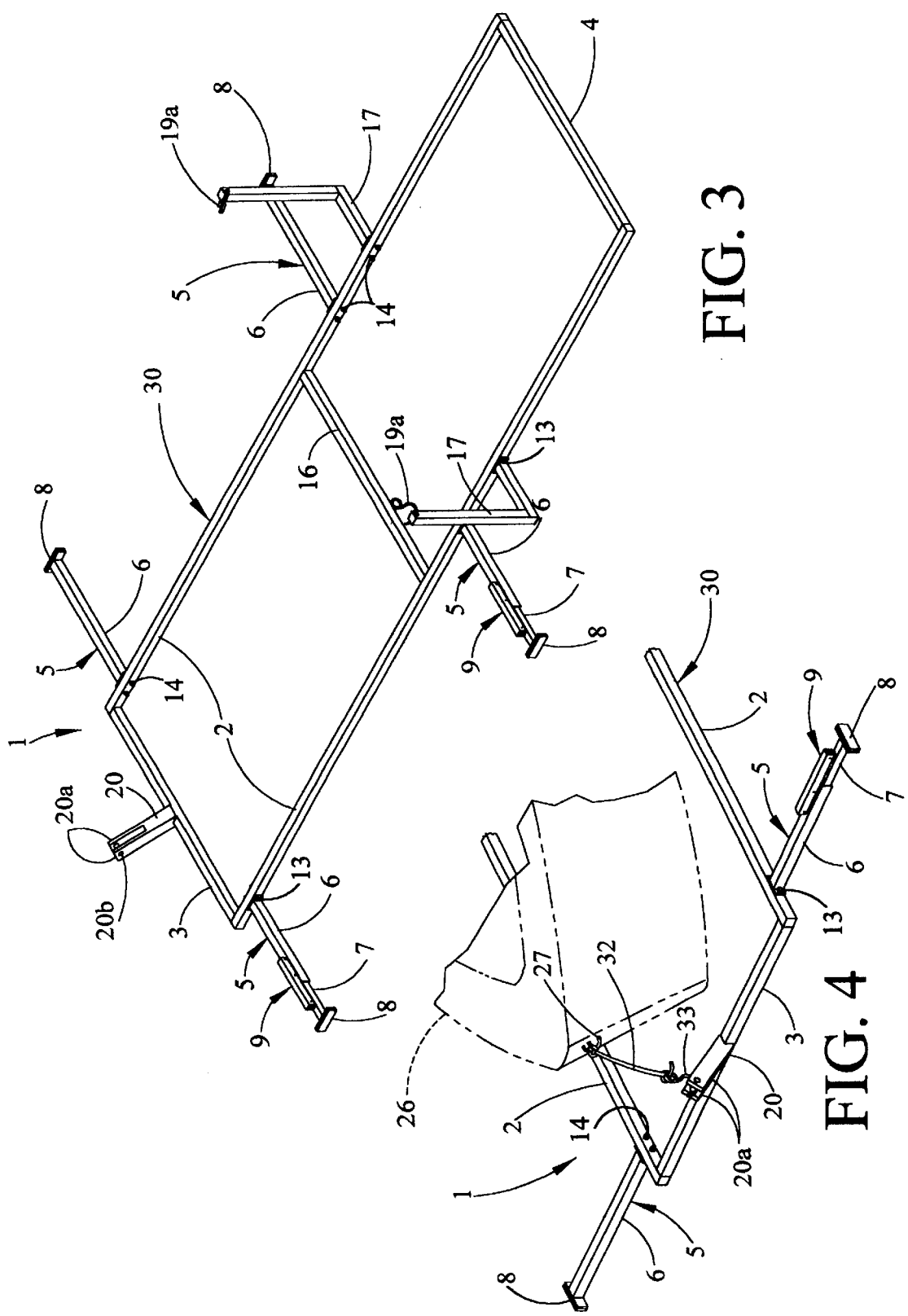

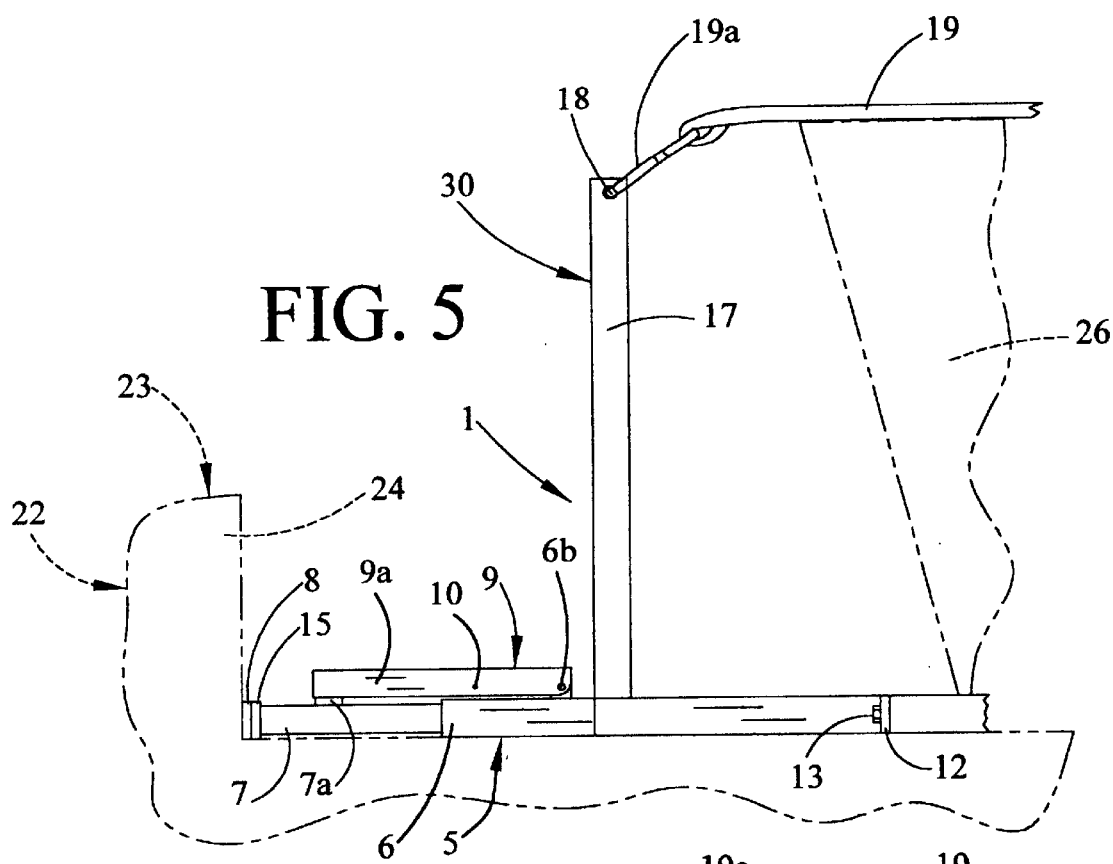
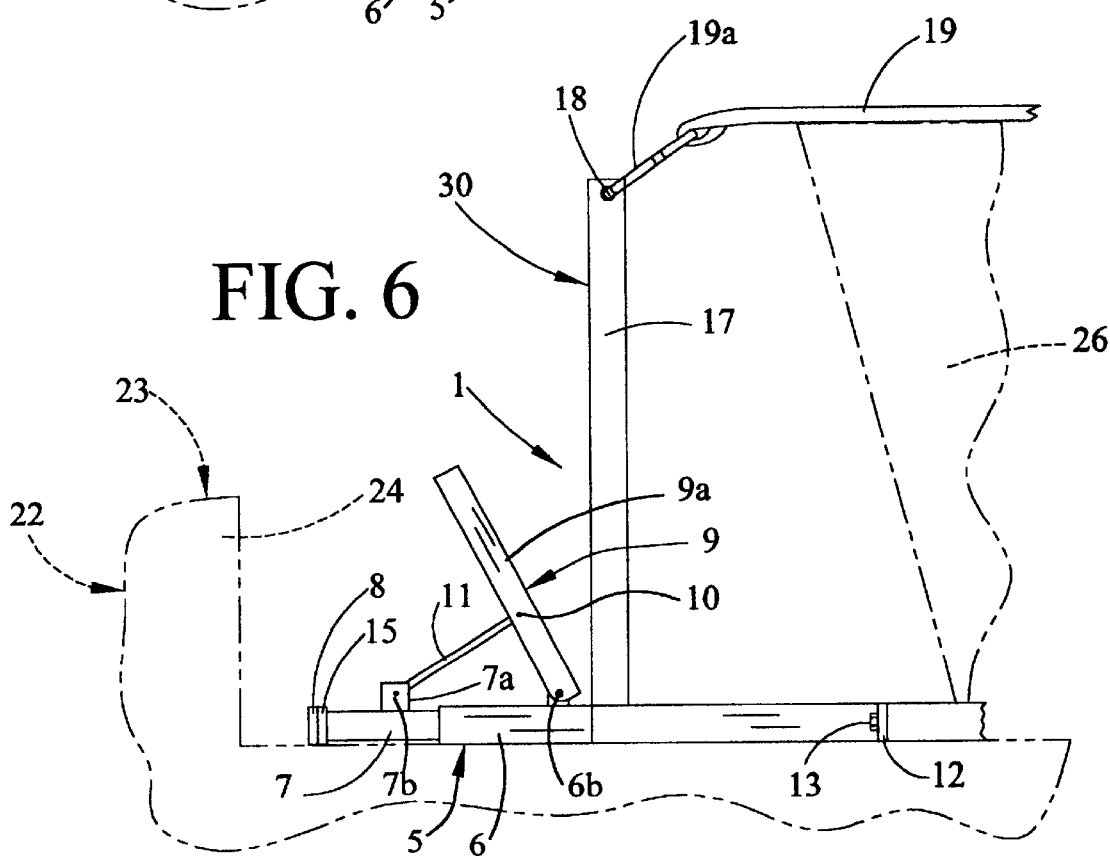

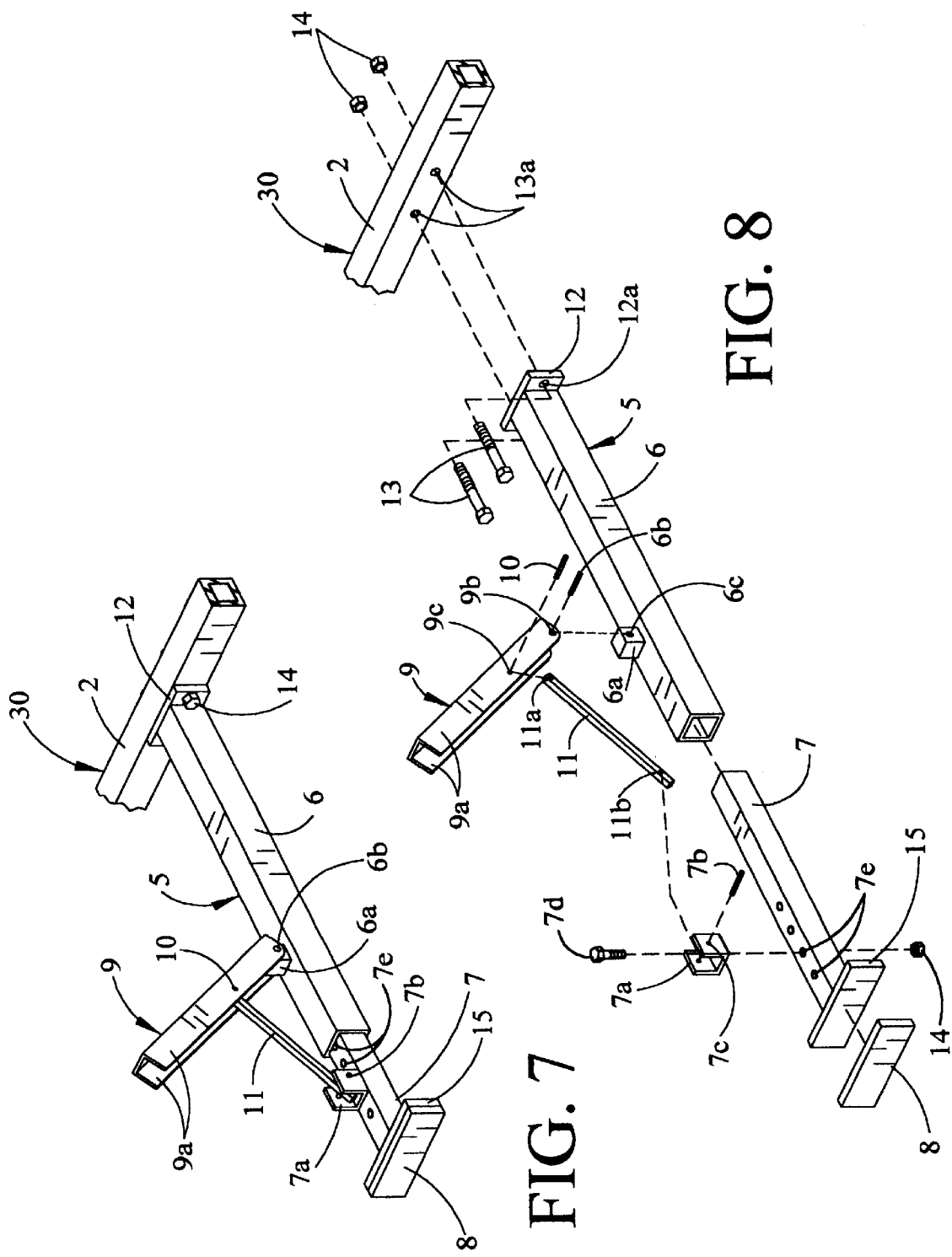

BOAT-CARRYING RACK

CROSS-REFERENCE TO RELATED APPLICATIONS

This application claims the benefit of U.S. Provisional Application Ser. No. 60/285,521, filed Apr. 23, 2001.

BACKGROUND OF THE INVENTION

Field of the Invention

This invention relates to devices for supporting boats and other watercraft on transporting vehicles and more particularly, to a boat-carrying rack which is removably fitted to the bed of a pickup truck for carrying a pirogue or other lightweight boat on the truck. In a preferred embodiment, the boat-carrying rack is characterized by an elongated, rectangular rack frame having a pair of fixed outriggers and a pair of padded, lever-operated foot plates mounted on adjustable outriggers, which foot plates are selectively extended from one side of the rack frame, to collectively engage the opposing side walls of the pickup truck bed, respectively, and removably secure the rack frame in the bed. The rack frame receives the boat, and a bow mount provided on the front end of the rack frame is removably fastened to the bow of the boat by means of a cord. A pair of upward-standing boat guides provided on respective sides of the rack frame receive an adjustable tie-down strap for further securing the boat on the rack frame. The padded foot plates can be selectively disengaged from the common side wall of the pickup truck bed to facilitate removing the boat-carrying rack from the truck, as desired.

Small, lightweight watercraft such as pirogues are typically transported on trailers or secured in the beds of large pickup trucks for transport. The latter method of transport is typically effected using multiple "bungee" cords or ropes which are secured to various elements of the pickup truck and the pirogue to secure the pirogue in the pickup truck bed. However, this method can be time-consuming and inadequate for securing the pirogue in the truck bed if not performed properly. Use of trailers to transport pirogues presents the problem of finding adequate space in which to store the trailer when not in use.

Various support devices for transporting a boat on a pickup truck are known in the art. U.S. Pat. No. 4,274,788, dated Jun. 23, 1981, to Sutton, describes a "Vehicle Mounted Carriage and Elevating Apparatus", characterized by a support frame secured to a vehicle. A link frame is pivotally secured to the support frame, and a post frame is pivotally secured to the vehicle. A carriage is movably secured to the post frame and to the link frame. An actuating apparatus secured between the support frame and the carriage is adapted to move the carriage from a lower inclined position extending rearwardly from the vehicle to a substantially horizontal, elevated position wherein the center of gravity of the carriage is positioned above the vehicle and between the wheels of the vehicle. U.S. Pat. No. 5,005,846, dated Apr. 9, 1991, to Taylor, discloses a "Jet Ski Transporter Carriage and Related Methods", including a transporter carriage upon which a jet ski is securely placed. The transporter carriage includes rails shaped to receive the jet ski, as well as releasibly interchangeable support systems which provide carriage support and mobility. A "Boat Launching Apparatus" is detailed in U.S. Pat. No. 5,354,164, dated Oct. 11, 1994, to Goss, et al. The Goss apparatus includes a trailer framework unit pivotally disposed on the rear bumper of a truck for receiving a boat, as well as an automatic control for raising and lowering the trailer framework unit relative to the bed of the truck. U.S. Pat. No. 5,542,810, dated Aug. 6, 1996, to Florus, describes an "Easily Removable Dual Purpose Apparatus for Safely Transporting Personal Watercraft in Truck Bed", characterized by an elongated frame which rests in the bed of a pickup truck and is secured to the respective side walls of the pickup truck bed by means of cords. The rear end of the frame is extendible for resting on the ground behind the truck, and a winch is provided on the frame for attachment to the bow of a boat such that operation of the winch pulls the boat onto the frame.

An object of the present invention is to provide a boat-carrying rack which can be easily and removably secured in the bed of a pickup truck for carrying a pirogue or other lightweight watercraft on the truck.

Another object of this invention is to provide a boat-carrying rack which is lightweight and simple in construction and operation.

Still another object of this invention is to provide a boat-carrying rack characterized by an elongated rack frame for receiving a pirogue or other lightweight boat, which rack frame includes a pair of fixed outriggers and a pair of padded foot plates selectively extendible from opposite sides of the rack frame for removably engaging the respective side walls of a pickup truck bed and removably securing the rack frame in the pickup truck bed.

Yet another object of the invention is to provide a boat-carrying rack for pickup trucks, characterized by an elongated rack frame fitted with a pair of upward-standing boat guides for receiving a boat; a pair of fixed outriggers extending from one side of the rack frame; a pair of selectively-extendible, lever-operated, padded outriggers provided on the opposite side of the rack frame for selectively engaging opposite side walls of the pickup truck bed, respectively, and removably mounting the rack frame on the pickup truck; a bow mount provided on the front end of the rack frame for attachment to the bow of the boat; and an adjustable tie-down strap provided on the boat guides for securing the boat between the boat guides of the rack frame.

SUMMARY OF THE INVENTION

These and other objects of the invention are provided in a boat-carrying rack which can be removably mounted in the bed of a pickup truck for receiving a pirogue or other lightweight watercraft or boat for transport. In a preferred embodiment, the boat-carrying rack is characterized by an elongated, generally rectangular rack frame having two pairs of oppositely-extending outriggers, two of which outriggers are fixed and the other two are adjustable and are fitted with selectively-extendible, lever-operated, padded foot plates for removably engaging opposite side walls of the pickup truck bed, respectively, and mounting the rack frame in the bed. A pair of upward-standing boat guides provided on opposite sides of the rack frame are fitted with an adjustable tie-down strap for engaging the boat and securing the boat on the rack frame. A bow mount extends from the front end of the rack frame for attachment to the bow of the boat during transport thereof on the rack frame. The boat can be easily removed from the rack frame by unfastening the tie-down strap and the bow mount, and the rack frame can be removed from the pickup truck bed by retracting the lever-operated foot plates of the respective outriggers from contact with a common side wall of the pickup truck.

BRIEF DESCRIPTION OF THE DRAWINGS

The invention will be better understood by reference to the accompanying drawings, wherein:

FIG. 3 is a perspective view of the boat-carrying rack, removed from the pickup truck and the respective outrigger components of the boat-carrying rack shown in the extended, truck-engaging configuration;

FIG. 4 is a front, perspective view of the boat-carrying rack (partially in section), with the bow of the boat attached to a bow mount on the rack frame;

FIG. 5 is a rear view, partially in section, of the rack frame component of the boat-carrying rack, with one of the adjustable outrigger components of the boat-carrying rack in the extended configuration and engaging one of the side walls of the pickup truck to removably secure the rack frame in the pickup truck bed, in application of the boat-carrying rack;

FIG. 6 is a rear view, partially in section, of the rack frame of the boat-carrying rack illustrated in FIG. 5, with the adjustable outrigger shown in the retracted, truck-disengaging configuration for removal of the boat-carrying rack from the wall of the pickup truck bed;

FIG. 7 is a perspective view of an adjustable outrigger component of the boat-carrying rack, extending from the rack frame (partially in section), with the adjustable outrigger shown in the retracted, truck-disengaging configuration; and FIG. 8 is an exploded, perspective view of the adjustable outrigger illustrated in FIG. 7.

DESCRIPTION OF THE PREFERRED EMBODIMENTS

Figure 1:
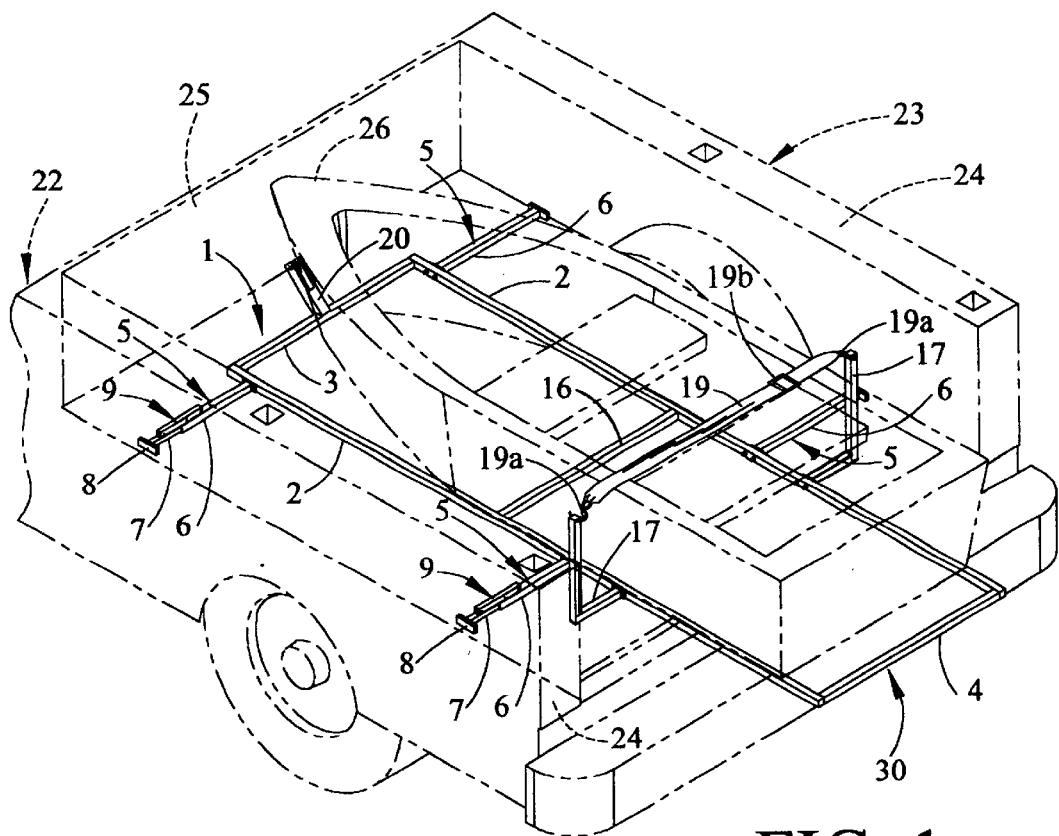
FIG. 1 is a perspective view of the boat-carrying rack of this invention, removably mounted in the bed (illustrated in phantom) of a pickup truck, and a boat (also illustrated in phantom) shown mounted on the truck-mounted rack.

Referring initially to FIGS. 3, 7 and 8 of the drawings, in a preferred embodiment the boat-carrying rack of this invention is generally illustrated by reference numeral 1. The boat-carrying rack 1 includes an elongated, substantially rectangular rack frame 30, typically constructed of steel, or preferably aluminum, square tubing. As illustrated in FIG. 3, the rack frame 30 is characterized by a pair of elongated, parallel side frame members 2, spanned by a front frame member 3 and a rear frame member 4 at opposite ends thereof, as well as a pair of parallel frame stiffeners 16 between the front frame member 3 and rear frame member 4. A bow mount 20 typically angles upwardly and forwardly from the front frame member 3, at substantially the midpoint thereof, and includes a pair of parallel bow mount flanges 20a having aligned flange openings 20b, the purpose of which bow mount 20 will be hereinafter described. As further illustrated in FIG. 3, a pair of boat guides 17 extends upwardly from the respective side frame members 2 of the rack frame 30, and each is provided with a pair of strap pin openings 18 (FIG. 5) adjacent to the upper, extending end thereof for receiving a corresponding strap pin 19a, fitted on the corresponding end of a conventional adjustable tie-down strap 19 (FIG. 1) for purposes which will be hereinafter described.

As further illustrated in FIG. 3, a pair of parallel outriggers 5 extends from each side frame member 2 of the rack frame 30, one set of which outriggers 5 is typically located adjacent to the front frame member 3 and the other set adjacent to the frame stiffener 16 of the rack frame 30. As illustrated in FIGS. 7 and 8, each outrigger 5 is characterized by an elongated outrigger leg 6, fitted on the attachment end thereof with a rectangular outrigger leg mount plate 12 having a pair of mount openings 12a (one of which is shown in FIG. 8) for receiving respective bolts 13 that are extended through respective bolt openings 13a provided in the corresponding side frame member 2. Each of the bolts 13 threadibly receives a securing mount nut 14 to mount the corresponding outrigger leg 6 on the side frame member 2 to define fixed and adjustable outriggers. A typically cube-shaped leg bracket 6a, through which extends a transverse pin opening 6c, is welded to, or otherwise mounted on the upper surface of two of the outrigger legs 6 located on one side of the rack frame 30 as adjustable outriggers. The leg bracket 6a accommodate the parallel, downwardly-extending lever flanges 9a of an elongated extension locking lever 9, having a generally U-shaped cross-sectional configuration. As further illustrated in FIG. 8, a leg bracket pin 6b is extended through aligned flange openings 9b provided in the respective lever flanges 9a of the extension locking lever 9 and through the registering pin opening 6c in the leg bracket 6a, and secured by means of a cotter pin (not illustrated) or other fastening mechanism known to those skilled in the art, to pivotally mount each extension locking lever 9 on the corresponding outrigger leg 6. An elongated outrigger extension 7 is telescopically extendible from each outrigger leg 6 of the adjustable outriggers and is fitted with a leg bracket 6a and terminates on a rectangular extension foot plate 15, preferably fitted with a resilient, typically rubber extension pad 8. A like extension pad 8 is secured to the extending end of the outrigger legs 6 which are fixed. An extension leg bracket 7a is upward-standing from the upper surface of each outrigger extension 7 and is provided with a pair of respective aligned pin openings 7c. An adjusting bolt 7d, secured by a corresponding nut 14, extends through an opening (not illustrated) in the extension leg bracket 7a and through a selected one of the adjusting bolt openings 7e in the outrigger extension 7 to compensate for the width of the pickup truck bed 23 in the "throw" or extension of the outrigger extension 7. A lever pin 10 is extended through aligned lever pin openings 9c provided in the respective lever flanges 9a of the extension locking bar 9, and through a registering lever pin opening 11a, provided in an elongated push bar 11 adjacent to the upper end thereof, and secured in the lever pin openings 9c and lever pin opening 11a by means of cotter pins (not illustrated) or other fastening mechanism. In similar fashion, an extension bracket pin 7b is extended through and secured in the registering pin openings 7c of the extension leg bracket 7a and through a registering extension bracket pin opening 11b, provided in the push bar 11 adjacent to the bottom end thereof. Accordingly, by pushing the extension locking lever 9 downwardly to the horizontal position illustrated in FIG. 3, each of the two outrigger extensions 7 is extended from the corresponding outrigger leg 6 of the outrigger 5 against the same side wall 24 of the pickup truck bed 23. By raising the extension locking bar 9 from the horizontal to the angled configuration illustrated in FIG. 7, each outrigger extension 7 is retracted into the corresponding outrigger leg 6 of the outrigger 5, for purposes which will be hereinafter described.

Figure 2:
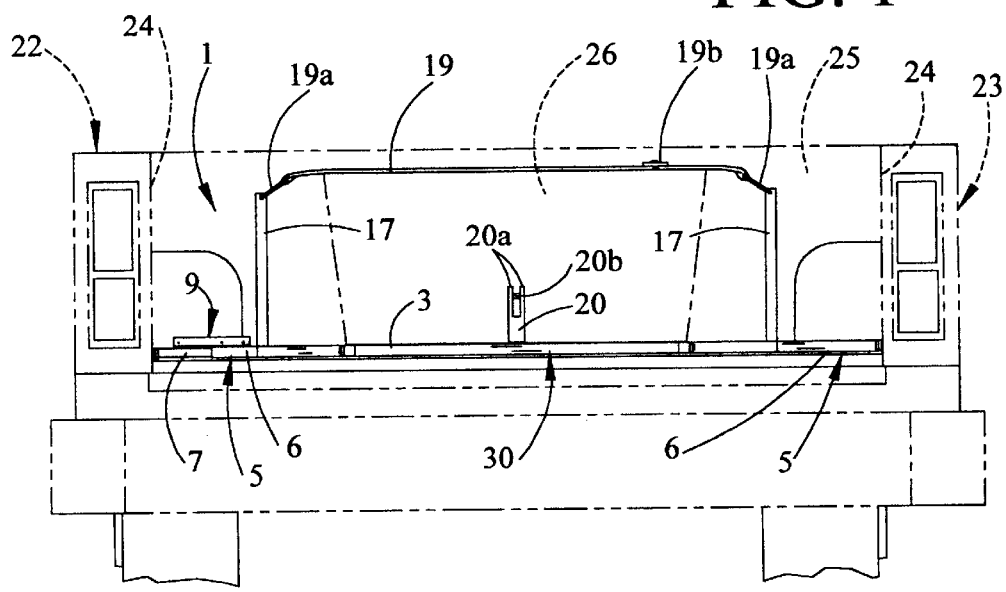
FIG. 2 is a rear view of the truck-mounted boat-carrying rack and the rack-mounted boat illustrated in FIG. 1.

Referring next to FIGS. 1, 2, 4, 5 and 6 of the drawings, in typical application of the boat-carrying rack 1, the rack frame 30 is placed in the bed 23 (illustrated in phantom) of a pickup truck 22, with the front frame member 3 of the rack frame 30 positioned adjacent to the front wall 25 of the pickup truck bed 23 and the rear end portion of the rack frame 30 extending beyond the pickup truck bed 23 and resting on the open truck bed door (not illustrated), as illustrated in FIG. 1. The rack frame 30 is secured in the pickup truck bed 23 by pushing the extension locking levers 9 of the respective adjustable ones of the outriggers 5 downwardly from the raised configuration illustrated in FIG. 6 to the horizontal configuration illustrated in FIG. 5, to extend the outrigger extensions 7 from the respective outrigger legs 6. If necessary to accommodate a specific width of the pickup truck bed 23, the respective degree of extension of the leg brackets 7a can be mounted on any of the respective adjusting bolt openings 11c by moving the adjusting bolt 7d. Accordingly, when the necessary adjustment is made, the extension pads 8, provided on the extension foot plates 15 of the respective adjustable outriggers, as well as the fixed outriggers, are pressed against the corresponding side wall 24 of the pickup truck bed 23, as further illustrated in FIG. 5, to secure the rack frame 30 in the pickup truck bed 23. A lightweight boat 26 such as a pirogue or the like can then be removably secured to the boat-carrying rack 1 by placing the boat 26 on the truck-secured rack frame 30 with the boat guides 17 extending upwardly on opposite sides of the boat 26, as illustrated in FIG. 2. The tie-down strap 19, fitted with the strap pins 19a, is then secured on the boat guides 17 by extending each strap pin 19a through the strap pin opening 18 (FIGS. 5 and 6) provided in the corresponding boat guide 17. The tie-down strap 19 is tightened against the boat 26 to secure the boat 26 between the boat guides 17, by pulling the end segment (not illustrated) of the tie-down strap 19 through the buckle 19b (FIG. 2) thereof, in conventional fashion. As illustrated in FIG. 4, the bow or front end of the boat 26 is secured to the bow mount 20 of the rack frame 30, by inserting a bow mount hook 33, provided on the end of a bow mount cord 32 attached to the boat 26 typically at a winch hook 27 thereof, through the aligned flange openings 20b (FIG. 3) provided in the parallel bow mount flanges 20a of the bow mount 20. Accordingly, the boat 26 is adequately secured on the rack frame 30 for transport in the pickup truck bed 23. The boat 26 is removed from the boat-carrying rack 1, as desired, by unfastening the tie-down strap 19 by loosening the tie-down strap 19 at the buckle 19b and then removing one of the strap pins 19a from the strap pin opening 18 of one of the boat guides 17, unfastening the bow mount hook 33 of the bow mount cord 32 from the bow mount 20 and lifting and removing the boat 26 from the rack frame 30. The boat-carrying rack 1 is removed from the pickup truck bed 23, as desired, by pivotally lifting the two extension locking levers 9 from the horizontal, locking configuration illustrated in FIG. 5 to the raised, unlocking configuration illustrated in FIG. 6, thereby retracting the outrigger extensions 7 into the corresponding outrigger legs 6 and thus, removing each extension pad 8 from contact with the corresponding side wall 24 of the pickup truck bed 23, and then lifting or sliding the rack frame 30 from between the side walls 24.

It will be appreciated by those skilled in the art that the boat-carrying rack of this invention is simple in construction and operation, lightweight and effective for removably mounting various types of lightweight watercraft, particularly pirogues, for transport in the bed of a pickup truck and requires no modification of the pickup truck to achieve that purpose.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A boat-carrying rack for mounting in the bed of a pickup truck and carrying a boat, said boat-carrying rack comprising:
    a rack frame for receiving the boat;
    a truck-engaging mechanism provided on said rack frame for removably engaging opposite walls of the pickup truck bed; and
    a boat mount mechanism comprising a pair of boat guides upward-standing from opposite sides of said rack frame and spaced from the opposite walls of the pickup truck bed for receiving the boat and stabilizing the boat on said rack frame.

2. The boat-carrying rack of claim 1 wherein said truck-engaging mechanism comprises a pair of outriggers provided on opposite sides of said rack frame for removably engaging the pickup truck bed.

3. The boat-carrying rack of claim 2 comprising a tie-down strap provided on said boat guides for removably engaging the boat.

4. A boat-carrying rack for mounting in the bed of a pickup truck and carrying a boat, said boat-carrying rack comprising:
    a rack frame for receiving the boat;
    at least one pair of fixed outriggers extending from one side of said rack frame for engaging a wall of the pickup truck bed;
    at least one pair of adjustable outriggers extending from the opposite side of said rack frame from said one side, each of said adjustable outriggers having a foot plate for selectively removably engaging a corresponding opposite wall of the pickup truck bed; and
    a boat mount mechanism provided on said rack frame for securing the boat on said rack frame.

5. The boat-carrying rack of claim 4 wherein said boat mount mechanism comprises a pair of boat guides upward-standing from opposite sides of said rack frame for receiving the boat and a tie-down strap provided on said boat guides for removably engaging the boat.

6. The boat-carrying rack of claim 4 wherein said at least one pair of adjustable outriggers comprises a single pair of adjustable outriggers extending from said opposite side of said rack frame.

7. The boat-carrying rack of claim 6 wherein said boat mount mechanism comprises a pair of boat guides upward-standing from opposite sides of said rack frame for receiving the boat and a tie-down strap provided on said boat guides for removably engaging the boat.

8. The boat-carrying rack of claim 4 wherein said boat mount mechanism comprises a bow mount provided on said rack frame for removable attachment to the boat.

9. The boat-carrying rack of claim 8 wherein said boat mount mechanism further comprises a pair of boat guides upward-standing from opposite sides of said rack frame for receiving the boat and a tie-down strap provided on said boat guides for removably engaging the boat.

10. The boat-carrying rack of claim 8 wherein said at least one pair of adjustable outriggers comprises a single pair of adjustable outriggers extending from said opposite side of said rack frame.

11. The boat-carrying rack of claim 10 wherein said boat mount mechanism further comprises a pair of boat guides upward-standing from opposite sides of said rack frame for receiving the boat and a tie-down strap provided on said boat guides for removably engaging the boat.

12. A boat-carrying rack for mounting in the bed of a pickup truck and carrying a boat, said boat-carrying rack comprising:

a rack frame for receiving the boat;

a pair of fixed outriggers extending from one side of said rack frame and engaging a wall of the pickup truck bed;

a pair of adjustable outriggers extending from the opposite side of said rack frame from said one side, each of said adjustable outriggers having an outrigger leg provided on said rack frame; an outrigger extension telescopically extendible from said outrigger leg; an extension locking lever pivotally carried by said outrigger leg and engaging said outrigger extension for selectively extending said outrigger extension from said outrigger leg; and a foot plate terminating said outrigger extension for selectively removably engaging the opposite side wall of the pickup truck bed; and a boat mount mechanism provided on said rack frame for securing the boat on said rack frame.

13. The boat-carrying rack of claim 12 wherein said boat mount mechanism comprises a pair of boat guides upward-standing from opposite sides of said rack frame for receiving the boat and a tie-down strap provided on said boat guides for removably engaging the boat.

14. The boat-carrying rack of claim 12 wherein said boat mount mechanism comprises a bow mount provided on said rack frame for removable attachment to the boat.

15. The boat-carrying rack of claim 14 wherein said boat mount mechanism further comprises a pair of boat guides upward-standing from opposite sides of said rack frame for receiving the boat and a tie-down strap provided on said boat guides for removably engaging the boat.

* * * * *